United States Patent
Horner et al.

(10) Patent No.: US 10,755,493 B2
(45) Date of Patent: Aug. 25, 2020

(54) METHOD FOR FUSELAGE LEAK MONITORING AND DETECTION BY AN INTEGRATED APU-ECS-CPCS SYSTEM

(71) Applicant: HONEYWELL INTERNATIONAL INC., Morris Plains, NJ (US)

(72) Inventors: Darrell Horner, Oro Valley, AZ (US); Gerard McCoy, Tucson, AZ (US)

(73) Assignee: Honeywell International Inc., Morris Plains, NJ (US)

( * ) Notice: Subject to any disclaimer, the term of this patent is extended or adjusted under 35 U.S.C. 154(b) by 163 days.

(21) Appl. No.: 16/025,507

(22) Filed: Jul. 2, 2018

(65) Prior Publication Data

US 2019/0287321 A1    Sep. 19, 2019

Related U.S. Application Data

(60) Provisional application No. 62/643,895, filed on Mar. 16, 2018.

(51) Int. Cl.
  *G07C 5/08*      (2006.01)
  *B64D 13/04*   (2006.01)
  (Continued)

(52) U.S. Cl.
  CPC .......... *G07C 5/0808* (2013.01); *G07C 5/085* (2013.01); *B64D 13/04* (2013.01); *B64D 13/06* (2013.01);
  (Continued)

(58) Field of Classification Search
  CPC .......... G07C 5/08; B64D 13/04; B64D 45/00
  See application file for complete search history.

(56) References Cited

U.S. PATENT DOCUMENTS 5,083,451 A    1/1992   Kling
7,607,318 B2  10/2009   Lui et al.
(Continued)

FOREIGN PATENT DOCUMENTS

EP    2740665 A1    6/2014

OTHER PUBLICATIONS

McGill et al., Fuselage Leak Detection by Monitoring Cabin Pressure Control System Outflow Valve, IP.com No. 000241926, Jun. 9, 2015.
(Continued)

*Primary Examiner* — Yuri Kan
(74) *Attorney, Agent, or Firm* — Shumaker & Sieffert, P.A.

(57) ABSTRACT

A system of pressure control for an environment to be pressurized includes a controller configured to calculate an environment leakage effective area CdALEAK according to: CdALEAK=f(Pc, Tc, Pa, WLEAK) wherein Pc is an environment pressure; Tc is an environment temperature; Pa is an ambient pressure outside of the environment; WLEAK=WECS−WOFV−WAPU; wherein WECS=air pressure inflow into the environment; WOFV=air pressure outflow to ambient that is outside of the environment; WAPU=f(Tin, Pin, APURPM, Flowfuel); wherein Tin=inlet temperature to a power source; Pin=inlet pressure to the power source; APURPM=rotational speed of the power source; Flowfuel=power source fuel flow. A processor is in communication with the controller and configured to compare a current CdALEAK value with a control limit; wherein the control limit is based on historical CdALEAK values.

20 Claims, 10 Drawing Sheets

(51) Int. Cl.
  *B64D 45/00* (2006.01)
  *B64D 13/06* (2006.01)
  *G07C 5/00* (2006.01)
(52) U.S. Cl.
  CPC ...... *B64D 2013/0611* (2013.01); *G07C 5/008* (2013.01); *G07C 5/0816* (2013.01)

(56) References Cited

U.S. PATENT DOCUMENTS

| | | | |
|---|---|---|---|
| 7,837,541 B2 | 11/2010 | Gray et al. | |
| 2011/0046822 A1* | 2/2011 | Gray | B64D 13/04 701/3 |
| 2014/0162542 A1* | 6/2014 | Huart | B64D 13/02 454/74 |

OTHER PUBLICATIONS

Kurokawa et al., "Determination of the Outflow Valve Opening Area of the Aircraft Cabin Pressurization System", 18th International Congress of Mechanical Engineering, Nov. 6-11, 2005.
Smith, "Calculation of Flow of Air and Diatomic Gases", Journal of the Aeronautical Sciences, 309-15, Jun. 1946.
EP search report in application No. 19162684.5, dated Jul. 29, 2019.
McGill et al., "Fuselage Leak Detection by Monitoring Cabin Pressure Control System Outflow Valve", ip.com, XP-002792917, Jun. 9, 2015.
Notice of Intent to Grant and Text Intended to Grant from counterpart European Application No. 19162684.5, dated Mar. 6, 2020, 76 pp.

* cited by examiner

| | | | Fuselage Leakage - CdA | | | | | |
|---|---|---|---|---|---|---|---|---|
| Flight No. | X-bar CdALEAK (sq-in) | X-DBL BAR | Lower Control Limit (LCL) | Upper Control Limit (UCL) | R | R-bar | R-LCL | R-UCL |
| Flight 1 | 0.646591187 | 0.524404297 | 0.327391208 | 0.721417386 | 0.019836426 | 0.01663208 | 0 | 0.3516687 |
| Flight 2 | 0.550473022 | 0.524404297 | 0.327391208 | 0.721417386 | 0.010681152 | 0.01663208 | 0 | 0.3516687 |
| Flight 3 | 0.505917358 | 0.524404297 | 0.327391208 | 0.721417386 | 0.030517578 | 0.01663208 | 0 | 0.3516687 |
| Flight 4 | 0.45007019 | 0.524404297 | 0.327391208 | 0.721417386 | 0.015258789 | 0.01663208 | 0 | 0.3516687 |
| Flight 5 | 0.449765015 | 0.524404297 | 0.327391208 | 0.721417386 | 0.021362305 | 0.01663208 | 0 | 0.3516687 |
| Flight 6 | 0.479977417 | 0.524404297 | 0.327391208 | 0.721417386 | 0.022888184 | 0.01663208 | 0 | 0.3516687 |
| Flight 7 | 0.425961304 | 0.524404297 | 0.327391208 | 0.721417386 | 0.032043457 | 0.01663208 | 0 | 0.3516687 |
| Flight 8 | 0.409786987 | 0.524404297 | 0.327391208 | 0.721417386 | 0.01373291 | 0.01663208 | 0 | 0.3516687 |
| Flight 9 | 0.507748413 | 0.524404297 | 0.327391208 | 0.721417386 | 0.006103516 | 0.01663208 | 0 | 0.3516687 |
| Flight 10 | 0.505001831 | 0.524404297 | 0.327391208 | 0.721417386 | 0.01220703 | 0.01663208 | 0 | 0.3516687 |
| Flight 11 | 0.570602417 | 0.524404297 | 0.327391208 | 0.721417386 | 0.016784668 | 0.01663208 | 0 | 0.3516687 |
| Flight 12 | 0.483627319 | 0.524404297 | 0.327391208 | 0.721417386 | 0.019836426 | 0.01663208 | 0 | 0.3516687 |
| Flight 13 | 0.546188354 | 0.524404297 | 0.327391208 | 0.721417386 | 0.01220703 | 0.01663208 | 0 | 0.3516687 |
| Flight 14 | 0.548934937 | 0.524404297 | 0.327391208 | 0.721417386 | 0.006103516 | 0.01663208 | 0 | 0.3516687 |
| Flight 15 | 0.573654175 | 0.524404297 | 0.327391208 | 0.721417386 | 0.025939941 | 0.01663208 | 0 | 0.3516687 |
| Flight 16 | 0.61882019 | 0.524404297 | 0.327391208 | 0.721417386 | 0.009155273 | 0.01663208 | 0 | 0.3516687 |
| Flight 17 | 0.514144897 | 0.524404297 | 0.327391208 | 0.721417386 | 0.019836426 | 0.01663208 | 0 | 0.3516687 |
| Flight 18 | 0.587081909 | 0.524404297 | 0.327391208 | 0.721417386 | 0.010681152 | 0.01663208 | 0 | 0.3516687 |
| Flight 19 | 0.497360229 | 0.524404297 | 0.327391208 | 0.721417386 | 0.01373291 | 0.01663208 | 0 | 0.3516687 |
| Flight 20 | 0.616378784 | 0.524404297 | 0.327391208 | 0.721417386 | 0.01663208 | 0.01663208 | 0 | 0.3516687 |
| | 0.524404297 | | | | | | 0 | 2.1144 |
| | X-DBL BAR | | | | R-DBL BAR | | D3 | D4 |

FIG. 3

Fuselage Leakage - CdA

| Flight No. | X-bar CdALEAK (sq-in) | X-DBL BAR | Lower Control Limit (LCL) | Upper Control Limit (UCL) | R | R-bar | R-LCL | R-UCL |
|---|---|---|---|---|---|---|---|---|
| Flight 1 | 0.646591187 | 0.524404297 | 0.327391208 | 0.721417386 | 0.019836426 | 0.01663208 | 0 | 0.035160217 |
| Flight 2 | 0.550473022 | 0.524404297 | 0.327391208 | 0.721417386 | 0.010681152 | 0.01663208 | 0 | 0.035160217 |
| Flight 3 | 0.505917358 | 0.524404297 | 0.327391208 | 0.721417386 | 0.030517578 | 0.01663208 | 0 | 0.035160217 |
| Flight 4 | 0.45007019 | 0.524404297 | 0.327391208 | 0.721417386 | 0.015258789 | 0.01663208 | 0 | 0.035160217 |
| Flight 5 | 0.449765015 | 0.524404297 | 0.327391208 | 0.721417386 | 0.021362305 | 0.01663208 | 0 | 0.035160217 |
| Flight 6 | 0.479977417 | 0.524404297 | 0.327391208 | 0.721417386 | 0.022888184 | 0.01663208 | 0 | 0.035160217 |
| Flight 7 | 0.425961304 | 0.524404297 | 0.327391208 | 0.721417386 | 0.032043457 | 0.01663208 | 0 | 0.035160217 |
| Flight 8 | 0.409786987 | 0.524404297 | 0.327391208 | 0.721417386 | 0.01373291 | 0.01663208 | 0 | 0.035160217 |
| Flight 9 | 0.507748413 | 0.524404297 | 0.327391208 | 0.721417386 | 0.006103516 | 0.01663208 | 0 | 0.035160217 |
| Flight 10 | 0.505001831 | 0.524404297 | 0.327391208 | 0.721417386 | 0.01373291 | 0.01663208 | 0 | 0.035160217 |
| ... | ... | ... | ... | ... | ... | ... | ... | ... |
| Flight 17 | 0.514144897 | 0.524404297 | 0.327391208 | 0.721417386 | 0.009155273 | 0.01663208 | 0 | 0.035160217 |
| Flight 18 | 0.587081909 | 0.524404297 | 0.327391208 | 0.721417386 | 0.019836426 | 0.01663208 | 0 | 0.035160217 |
| Flight 19 | 0.497360229 | 0.524404297 | 0.327391208 | 0.721417386 | 0.010681152 | 0.01663208 | 0 | 0.035160217 |
| Flight 20 | 0.616378784 | 0.524404297 | 0.327391208 | 0.721417386 | 0.030517578 | 0.01663208 | 0 | 0.035160217 |
| Flight 21 | 0.755917358 | 0.524404297 | 0.327391208 | 0.721417386 | 0.01373291 | 0.01663208 | 0 | 0.035160217 |
| Flight 22 | 0.850473022 | 0.524404297 | 0.327391208 | 0.721417386 | 0.010681152 | 0.01663208 | 0 | 0.035160217 |
| Flight 23 | 0.82007019 | 0.524404297 | 0.327391208 | 0.721417386 | 0.015258789 | 0.01663208 | 0 | 0.035160217 |
| Flight 24 | 0.819765015 | 0.524404297 | 0.327391208 | 0.721417386 | 0.021362305 | 0.01663208 | 0 | 0.035160217 |
| Flight 25 | 0.849977417 | 0.524404297 | 0.327391208 | 0.721417386 | 0.022888184 | 0.01663208 | 0 | 0.035160217 |
| | 0.524404297 | | | | 0.01663208 | | 0 | 2.1144 |
| | X-DBL BAR | | | | R-DBL BAR | | D3 | D4 |

FIG. 6

METHOD FOR FUSELAGE LEAK MONITORING AND DETECTION BY AN INTEGRATED APU-ECS-CPCS SYSTEM

CROSS-REFERENCE TO RELATED APPLICATIONS

This application claims the benefit of and priority to U.S. provisional application Ser. No. 62/643,895, filed Mar. 16, 2018, which is incorporated herein in its entirety.

BACKGROUND OF THE INVENTION

The present invention generally relates to pressure control and, more particularly, to apparatus and methods for detecting excessive pressure leakage.

In flight, Cabin Pressure Control Systems (CPCSs) normally exhaust pressurized cabin air directly to atmosphere pressure.

On some aircraft, this pressurized cabin air is used to provide a very small amount of aft thrust by utilizing a thrust recovery type outflow valve that accelerates the cabin air exhaust to super-sonic pressure ratios and directs this exhaust as close to the aft direction as is geometrically possible—given the constraints of the valve installation. Thrust recovery valves are not aerodynamically efficient when full-open on the ground with a low pressure ratio, and thus are very large, heavy, and expensive. Further, thrust recovery valves operate with very high aerodynamic torques, causing large rotary actuator gear boxes and motors. This makes the rotary actuators heavy and expensive and requires higher-current motor controllers (which also dissipate more power and are large and expensive).

An alternative use of cabin air exhaust for its potential energy is considered where the cabin air exhaust is consumed directly by the APU core compressor. This pressurized air enables increased APU operating efficiency relative to the APU ingesting atmosphere air—especially when the airplane is in flight and the atmosphere air is at relatively (to the pressurized cabin) low pressure.

Use of cabin pressure air directly in the APU core compressor assumes that there is enough air conditioning (environmental control system, ECS) flow into the cabin to overcome the exhausts of cabin air through the APU, the outflow valves (OFV), and any natural leakage paths out of the pressurized fuselage:

$$WECS \geq WAPU + WOFV + WLEAKS$$

This relationship is required to pressurize the cabin safely while also providing adequate flow to the APU for its intended functions (output power).

Further, for a new or relatively new airplane, the fuselage leakage flow may be less than when the airplane is older and doors, window, and other seals age. For an older airplane when more cabin inflow is lost to fuselage leakage, flow to the APU may be reduced (by throttling the cabin exhaust flow to the APU) to ensure that the fuselage is adequately pressurized for occupant safety and comfort. Unfortunately, with a reduction in APU flow, the APU efficiency and ability to produce power can be adversely affected such that the overall system cannot fulfill its intended functionality.

Legacy systems (which do not feed the APU with cabin air) do not currently compute an absolute value for the fuselage leakage, although relative leakage can be considered too great if outflow valves are closed and the fuselage is unable to pressurize according to the expected schedule. However, this condition can also be caused by a reduction of ECS flow below the margin required to pressurize. Thus, without knowing the ECS flow, it is impossible to determine whether the loss of pressure is due to excessive leakage or low ECS flow.

A method to monitor the fuselage leakage on a legacy system (which does not feed the APU with cabin air) architecture is provided in McGill et al., "Fuselage Leak Detection by Monitoring Cabin Pressure Control System Outflow Valve," IP.com number000241926, IP.com Electronic Publication Jun. 9, 2015. This method employed monitoring outflow valve positions as the monitored system, looking at ECS and Ventilation System special causes to invalidate the outflow valve monitoring, if required. This description does not account for pressurized air flow through the APU, which adds another degree of freedom to the problem of monitoring the actual fuselage leakage.

As can be seen, there is a need for improved apparatus and methods to monitor and detect excessive fuselage leakage over the in-service life of an airplane and which integrate with the APU, ECS, and CPCS.

SUMMARY OF THE INVENTION

In one aspect of the present invention, a system of pressure control for an environment to be pressurized comprises a controller configured to calculate an environment leakage effective area CdALEAK according to: CdALEAK=f(Pc, Tc, Pa, WLEAK) wherein: Pc is an environment pressure; Tc is an environment temperature; Pa is an ambient pressure outside of the environment; WLEAK=WECS−WOFV−WAPU; wherein: WECS=air pressure inflow into the environment; WOFV=air pressure outflow to ambient that is outside of the environment; WAPU=f(Tin, Pin, APURPM, Flowfuel); wherein: Tin=inlet temperature to a power source; Pin=inlet pressure to the power source; APURPM=rotational speed of the power source; Flowfuel=power source fuel flow; a processor in communication with the controller and configured to compare a current CdALEAK value with a control limit; wherein the control limit is based on historical CdALEAK values.

In another aspect of the present invention, a pressure control system for an environment, within an enclosure, to be pressurized is disclosed. In an example, the pressure control system comprises an environment pressure sensor; an ambient pressure sensor; a controller in communication with the environment pressure sensor and the ambient pressure sensor; wherein the controller is configured to calculate an effective area of a leakage, wherein the effective area of the leakage represents pressurized air leakage from an enclosure when (1) an air pressure in the enclosure is at a constant pressure Pc, and (2) an ambient pressure outside of the enclosure is at a constant pressure Pa; wherein the air pressure in the enclosure is from an environmental control system that receives pressurized air from an auxiliary power unit (APU); and a processor in communication with the controller and configured to compare the effective area of the leakage with a control limit.

In yet another aspect of the present invention, a non-transitory computer readable medium with computer executable instructions stored thereon, executed by a processor, to perform a method for controlling pressure in an environment within an enclosure, the method comprises calculating, via a controller, an environment leakage effective area CdALEAK according to: CdALEAK=f(Pc, Tc, Pa, WLEAK) wherein: Pc is an environment pressure; Tc is an environment temperature; Pa is an ambient pressure outside of the environment; WLEAK=WECS−WOFV−WAPU;

wherein: WECS=air pressure inflow into the environment; WOFV=air pressure outflow to ambient that is outside of the environment; WAPU=f(Tin, Pin, APURPM, Flowfuel) wherein: Tin=inlet temperature to a power source; Pin=inlet pressure to the power source; APURPM=rotational speed of the power source; Flowfuel=power source fuel flow; and comparing, via a processor in communication with the controller, a current CdALEAK value with a control limit; wherein the control limit is based on historical CdALEAK values.

These and other features, aspects and advantages of the present invention will become better understood with reference to the following drawings, description and claims.

BRIEF DESCRIPTION OF THE DRAWINGS

FIG. 3 is a database of X-bar historical fuselage leakage effective areas and control limits in a pressure control system according to an embodiment of the present invention;

FIG. 6 is a database of historical and continuing X-bar fuselage leakage effective areas and control limits in a pressure control system according to an embodiment of the present invention;

DETAILED DESCRIPTION OF THE INVENTION

Figure 1:
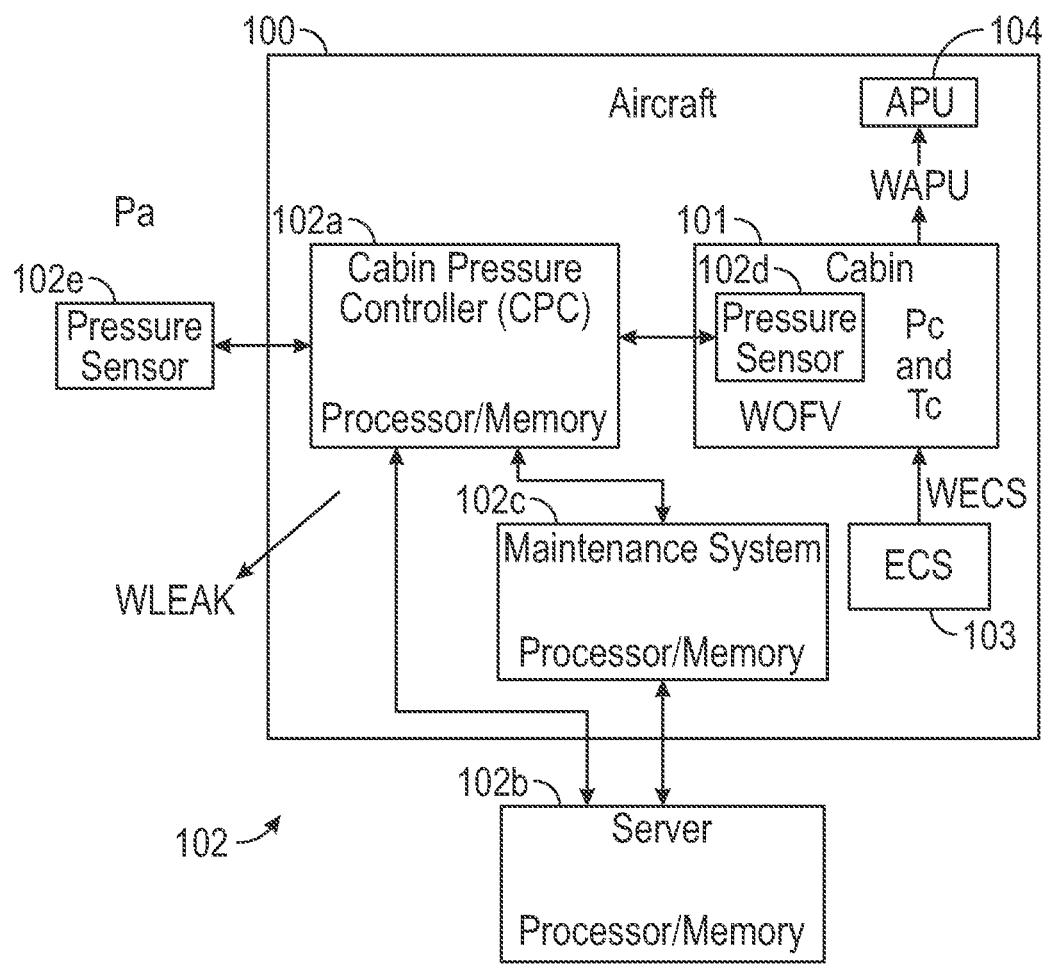
FIG. 1 is a block diagram of a system of pressure control according to an embodiment of the present invention.

The following detailed description is of the best currently contemplated modes of carrying out the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features. However, any single inventive feature may not address any of the problems discussed above or may only address one of the problems discussed above. Further, one or more of the problems discussed above may not be fully addressed by any of the features described below.

Broadly, the present invention provides apparatus and methods to monitor and detect excessive fuselage leakage (e.g., in the context of aircraft) when the system includes the use of cabin air into the APU core compressor. This is important because if the leakage becomes too great, and most of the ECS pressurization flow is lost through leakage exhaust, the APU may not be supplying sufficient cabin air to efficiently produce power.

Generally, this invention utilizes the absolute values of outflow valve flow, APU flow, and ECS flow to compute an effective area of the fuselage leakage CdALEAK. This invention considers the variation in accuracy from each of the computed flows (outflow valve, APU, and ECS) in its implementation by using statistical techniques to monitor the computed leakage effective area and a range between these calculations.

A benefit of this invention is that it can detect a condition where the APU can no longer efficiently provide power due to excessive leakage of the fuselage. This invention can enable cost savings, per hour of airplane operation, by using the APU to its full potential. This invention provides a practical method of fuselage leak detection without adding dedicated sensors for this purpose.

In contrast to past designs which may simply measure actual flow leakage of the fuselage (mass of flow per unit time), the present invention uses an Effective Area of Leakage (units of distance-squared), because this is a parameter that can be considered a constant for the fuselage structure regardless of operating conditions of the aircraft. In past designs that merely measure actual fuselage leakage, the measured leakage will change depending on the changing operating conditions (e.g., altitude) of the aircraft. Therefore, the prior art use of actual fuselage leakage was susceptible to operating parameters which affect the absolute value of fuselage leakage—such as cabin pressure, ambient pressure, or cabin temperature—all of which change each flight for varying reasons.

By using Effective Area of Leakage according to the present invention, the result will be comparable to other flights' derivations of Effective Area of Leakage without concern particularly to cabin/ambient pressures or the temperature for that moment the calculation is made. In the invention, the degradation of the fuselage Effective Area of Leakage over time can be measured and excessive degradation is identified so that corrective action can be taken before this leakage results in an uneconomical situation, or worse, an unsafe situation.

Accordingly, the present invention is not merely another way of calculating and/or monitoring fuselage leakage throughout the travel/flight of a vehicle. Rather, the present invention provides an improved manner of enabling corrective action to ensure vehicle and occupant safety, regardless of the changing operating conditions of the vehicle.

Although the present invention is described below in the context of aircraft, the present invention is not so limited. For example, the present invention may be implemented in land vehicles.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable media having computer readable program code embodied thereon.

Any combination of one or more computer readable storage media may be utilized. A computer readable storage medium is an electronic, magnetic, optical, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium is any tangible medium that can store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 is a block diagram of an enclosure 100 with a pressure control system 102 according to an exemplary embodiment of the present invention. As an example, the enclosure 100 may be an aircraft or other vehicle. The enclosure 100 may include therein an environment 101 to be pressurized for human occupants. As an example, the environment 101 may be a cabin of an aircraft.

In embodiments, the pressure control system 102 can be configured to predict failure of the system 102 and thus better ensure appropriate pressurization of the environment. In embodiments, the system 102 may include a cabin pressure controller (CPC) 102a, a server 102b, a maintenance system 102c, an environment valve/sensor(s) 102d, and an ambient valve sensor(s) 102e.

According to embodiments, the controller 102a may be implemented in software and/or hardware and include a processor and memory. The controller 102a may be in communication with one or more of the server 102b, the maintenance system 102c, the environment valve/sensor(s) 102d, and the ambient sensor 102e. The controller 102a may be located inside of the enclosure 100.

The maintenance system 102c (i.e., controller) may be a software and/or hardware system with a processor and memory, in embodiments. The maintenance system 102c may generally monitor the health of the enclosure 100. It may be located inside of the enclosure 100.

In embodiments, the computer server 102b (i.e., controller) with a processor and memory may be located outside of and not affixed to the enclosure 100. For example, the server 102b may be located on the ground and accessible to maintenance personnel outside of the enclosure 100. In embodiments, the server 102b may take the place of and thus perform the functions of the maintenance system 102c.

In embodiments, the environment pressure sensor(s) 102d may be inside of the enclosure 100, such as inside of the environment 101. The environment valve/sensor(s) 102d can be configured to continuously sample and monitor its valve position which enables cabin outflow to ambient atmosphere outside of the enclosure 100. The environment valve/sensor(s) 102d may be further configured to send/receive a plurality of valve position signals to/from the controller 102a.

In embodiments, the ambient pressure sensor(s) 102e may be outside of the enclosure 100. The ambient pressure sensor(s) 102e can be configured to continuously sample and monitor its pressure. The ambient pressure sensor(s) 102e may be further configured to send/receive a plurality of pressure sensor signals to/from the controller 102a.

The pressure control system 102 can be configured to be in air communication with an air conditioning system (environmental control system—ECS) 103 that provides conditioned air inflow to the fuselage (cabin) 101. This can be represented by WECS. The ECS 103 can have multiple system control elements, including an ECS controller which can measure and control the WECS into the cabin using industry known techniques.

Also, the pressure control system 102 can be configured to be in air communication with an auxiliary power unit (APU) 104. The APU 104 can be configured to provide pressurized air to the ECS 103. The APU 104 can have a controller that can determine its flow (WAPU), using characterization of the APU inlet temperature (Tin), APU inlet pressure (Pin), APU rotational speed (APURPM), and APU fuel flow (Flowfuel):

$$WAPU=f(Tin, Pin, APURPM, Flowfuel).$$

The cabin pressure outflow valve(s) 102d that exhaust air to ambient pressure is represented by WOFV. The cabin pressure outflow valve(s) 102d may contain a valve position sensor(s) to measure an outflow valve position (α). The cabin pressure controller 102a can calculate WOFV when the airplane is at higher altitudes and can calculate a ratio between the cabin pressure (Pc) and the ambient pressure (Pa). The cabin pressure controller 102a may also determine when the ratio is greater than or equal to a control limit (e.g., Pc/Pa≥1.87), using the measured outflow valve angular position (α) and by knowing the cabin pressure, the ambient pressure, and the cabin temperature (Tc):

$$WOFV=f(Pc, Pa, α, Tc)$$

Figure 2A:
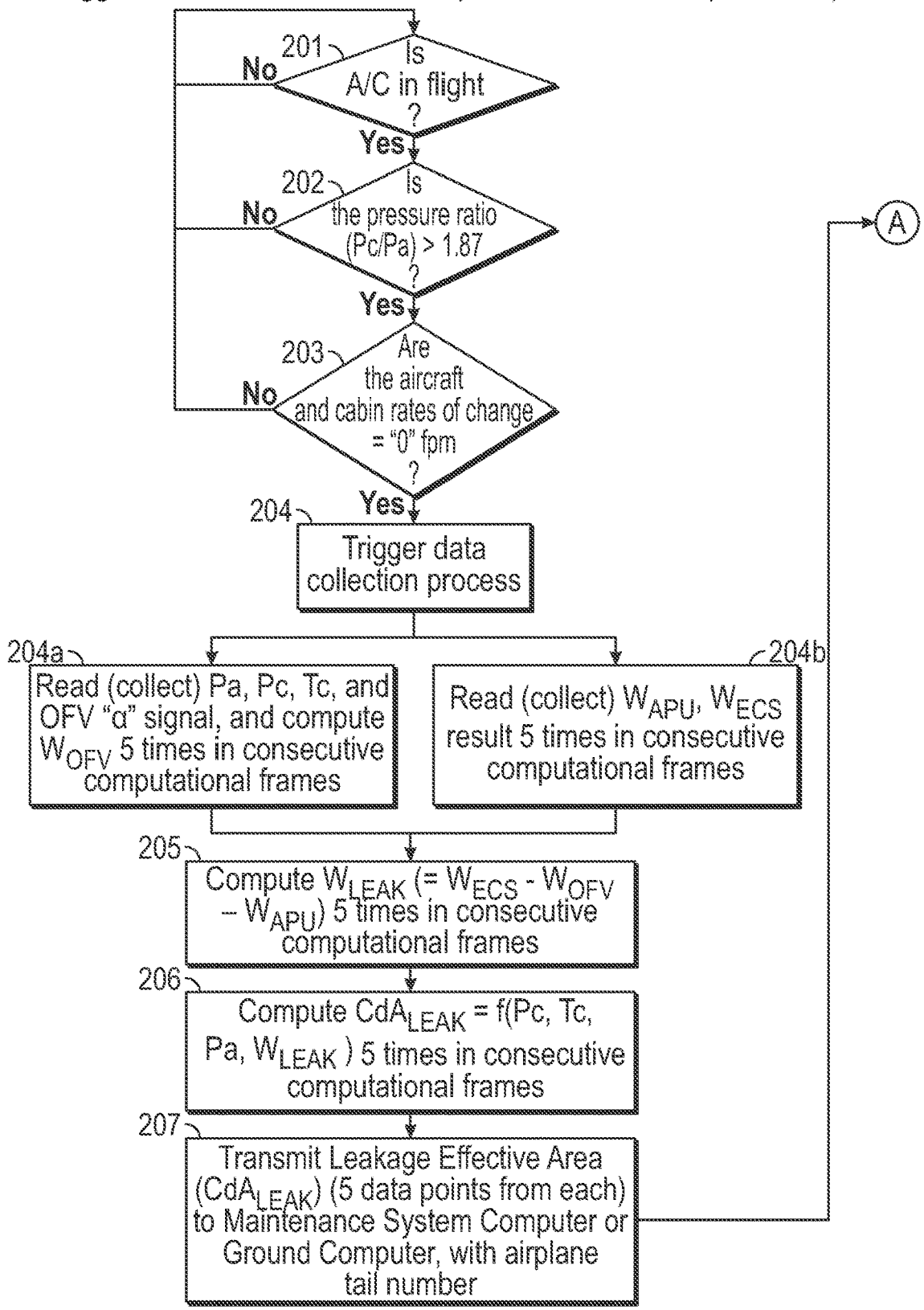
FIGS. 2A-2C is a flow chart of a method of pressure control according to an embodiment of the present invention.
Figure 2B:
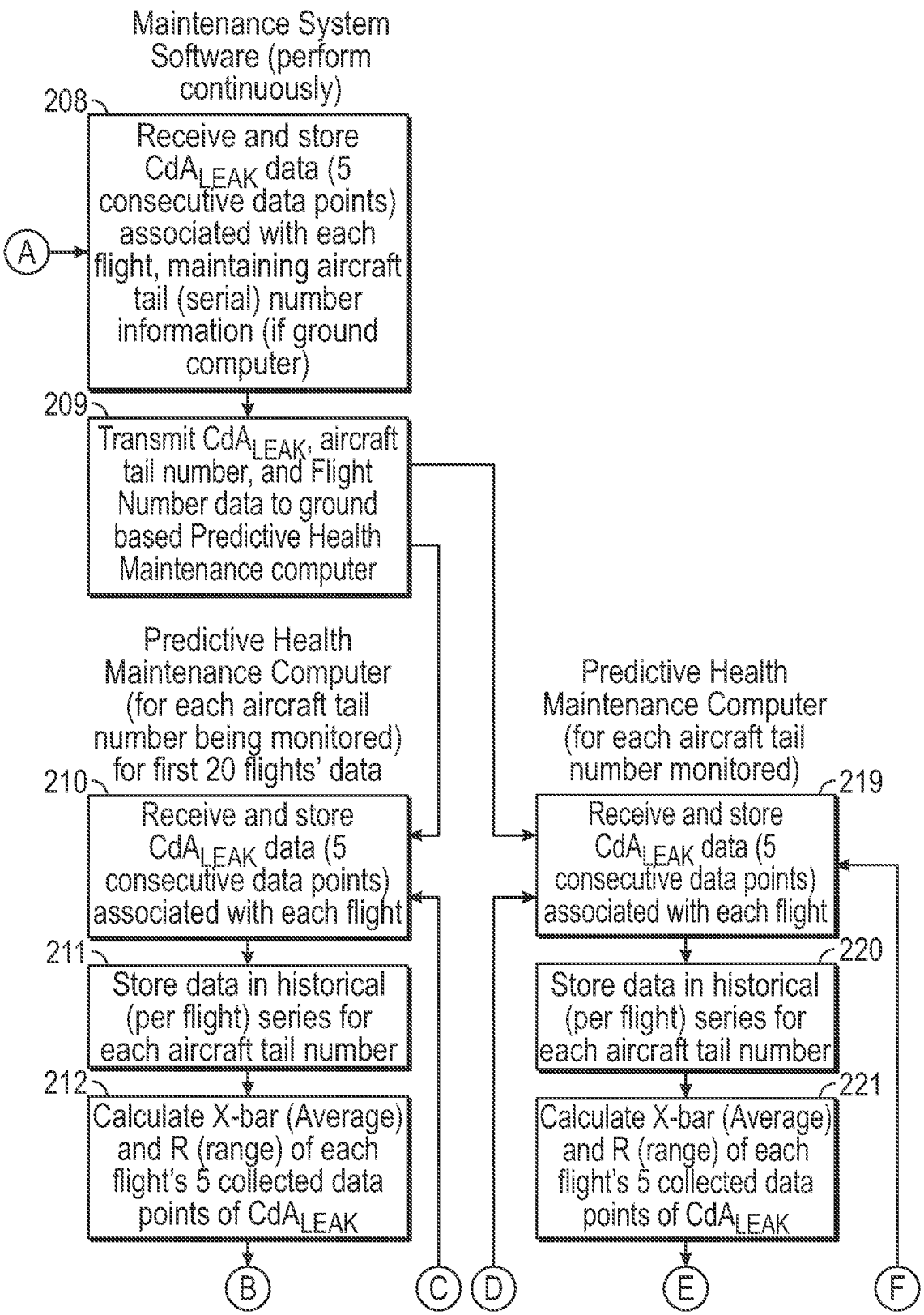
Figure 2C:
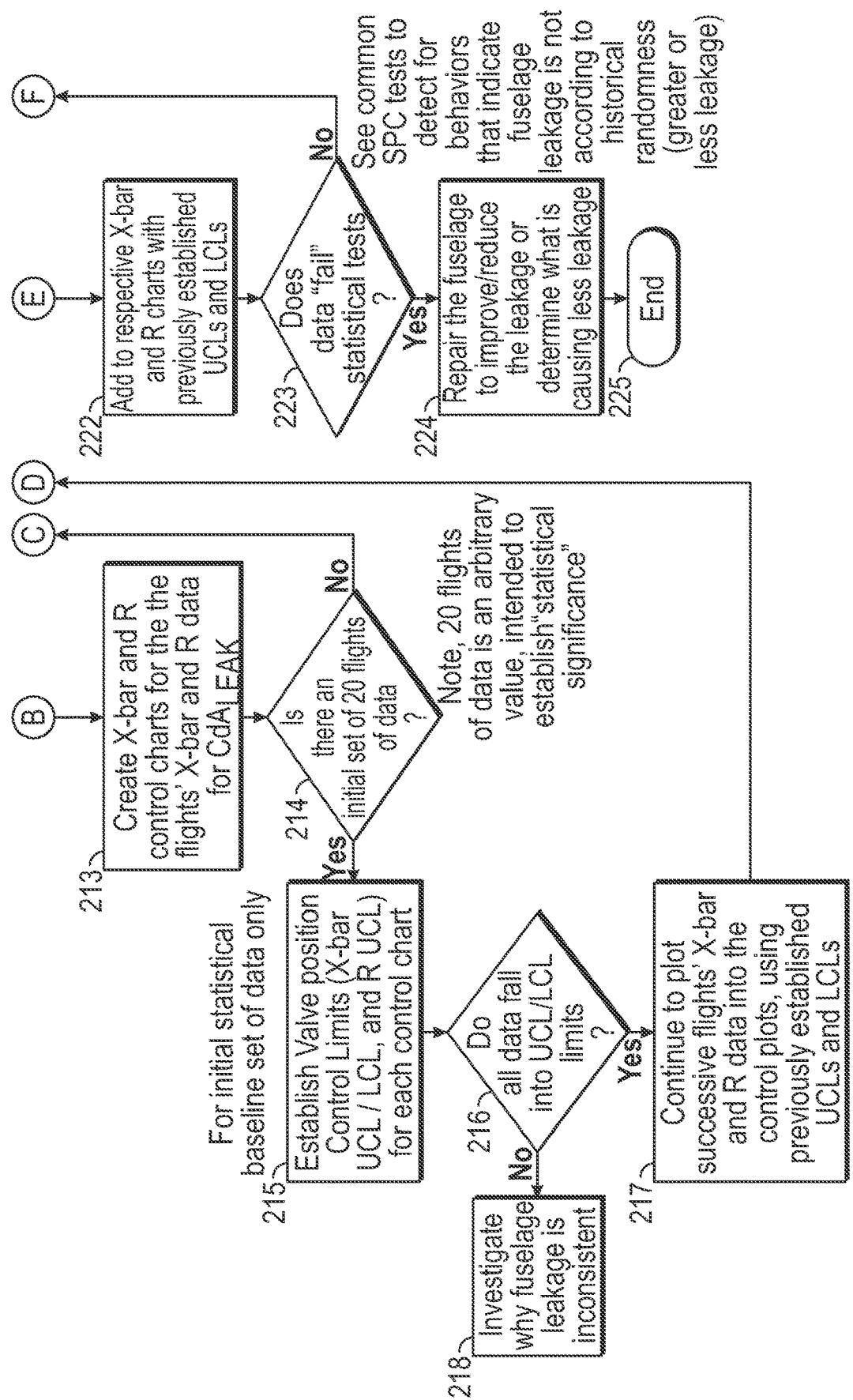

FIGS. 2A-2B is a flow chart of a pressure control method 200 according to an exemplary embodiment of the present invention. The method 200 can employ the pressure control system 102 of FIG. 1, as an example. The following is a general description of the method 200.

According to the method 200, when the cabin pressure is constant (i.e., cabin pressure rate of change is zero), the leakage flow rate (WLEAK) can be computed as follows:

$$WLEAK=WECS-WOFV-WAPU.$$

Then, the effective area of the fuselage leakage (CdALEAK) can be computed from the cabin pressure, cabin temperature, ambient pressure, and the computed leakage flow rate (WLEAK). The effective area of the fuselage leakage (CdALEAK) represents a result that can be compared to other historical CdALEAK values where the airplane may have been at different operating conditions—including different WECS, different WAPU, different environment (cabin) pressure, and/or different ambient pressure, and different cabin environment temperature. For example, the CdALEAK might remain relatively constant from two flights in the same day, even though the WLEAK result might be computed significantly different due to, for example, a lower cabin temperature condition on the second flight relative to the first flight.

CdALEAK can be computed according to a reformulation of industry available formulae that have calculated fuselage leakage (as opposed to effective leakage area). One formulation for calculating fuselage leakage is from Chester W. Smith ("Calculation of Flow of Air and Diatomic Gases" by the Journal of the Aeronautical Sciences, June 1946 (pp 309-315)), which is incorporated herein by reference. The present invention reformulates an equation for calculating fuselage leakage into the following relationship.

$$CdALEAK=f(Pc, Tc, Pa, WLEAK).$$

Thus, by removing the cabin pressure, ambient pressure, and cabin temperature (all varying parameters for each flight), the CdALEAK result is normalized from flight to flight. Again, this relationship is simplified when the ratio of cabin pressure divided by ambient pressure is greater than or equal to a given value, such as 1.87 (Pc/Pa≥1.87) as an example, because the exhaust flow through the outflow valve (WOFV) and fuselage leak (WLEAK) can be computed without regard to the "Isentropic Coefficient" ("N" in some industry texts). The Isentropic Coefficient is a factor for computing airflow across a restriction that considers the specific heat of the gas being measured (air) and the pressure ratio (Pc/Pa). The Isentropic Coefficient is a complex calculation when the pressure ratio (Pc/Pa) is <1.87. However, when the cabin pressure divided by the ambient pressure is greater than or equal to 1.87, the flow is considered "critical" and the downstream pressure (ambient pressure) is no longer a factor in the derivation of the Isentropic Coefficient (N), and the Isentropic Coefficient (N) is equal to "1.0."

The fuselage leakage effective area, CdALEAK, can be computed by the cabin pressure controller, using the above relationships, by receiving WAPU and WECS and computing the remaining portions itself.

Likewise, the APU 104 controller or the ECS 103 controller can compute the CdALEAK by receiving inputs from the CPCS 102a (WOFV) and the respective flows from the other controller. For the purposes of this embodiment, we assume that the CPCS performs the calculations of CdALEAK.

Because parameters WECS and WAPU can be continuously computed and transmitted to the CPCS, the data will be "fresh" upon the triggering event described below.

The CdALEAK sequence can be calculated at least once per flight when the airplane is at cruise, the cabin altitude rate of change is "zero," and the pressure ratio between cabin pressure and ambient pressure is greater than or equal to a given value (e.g., Pc/Pa≥1.87). Upon all of these conditions being true, a "trigger" can cause the CPCS to calculate five (for example) consecutive CdALEAK values (i.e., current CdALEAK values).

Upon the same trigger event, the CPCS can transmit each of the five consecutive CdALEAK values to a maintenance computer 102c and/or off of the airplane to a ground-based computer 102b for the rest of the method.

Also, upon the triggering event, if a ground-based computer is utilized, the system can also provide the airplane "tail" number to ensure that the data is associated with a unique airplane (and its fuselage).

The (ground-based) maintenance computer can then utilize the five consecutively computed CdALEAK values to perform the following.

A sample mean ($\bar{x}$) of the five consecutively sampled CdALEAK values can be computed. This mean can be called the "X-bar" result for that given flight.

A "range" of the five consecutively sampled CdALEAK values can be computed by determining the minimum and maximum values, and subtracting the minimum from the maximum. This range may be called the "R" result for that given flight.

However, as described below, the present invention is more than just calculating CdALEAK.

After the initial set of at least twenty flights (for example), but even as many as fifty flights (for example), X-bar and R statistical process control charts can be created from the X-bar and R data to set a statistical "baseline" for the CdALEAK performance.

X-bar and R charts are well known and, for example, are described in DeVor, Chang, Sutherland, "Statistical Quality Design and Control Contemporary Concepts and Methods", Macmillan, 1992, Chapters 5 and 6 which are incorporated herein by reference.

For the X-bar data, a mean of the X-bar (mean of the means "$\bar{\bar{x}}$") and upper and lower control limits are established using the DeVor, Chang, Sutherland method.

Also using DeVor, Chang, and Sutherland's method, for the R data, a mean of the "Rs" and upper and lower control limits are established.

After the control charts are established, future flights' CdALEAK data is evaluated for tendencies of increased leakage using a baseline 20 to 50 flights (for example) worth of data (baseline control charts).

Knowing that sometimes the computed WOFV, WAPU, and WECS have variation in them due to the nature of the calculations, the R (range of the min/max CdALEAK data) control chart can establish an expectation of normal variation that can be monitored using statistical techniques—comparing the future data against the established upper and lower control limits from the initial set of 20 to 50 flights of data.

Then, as long as the subsequent "R" data plots appropriately in the R control chart, the values of X-bar (of the CdALEAK data) can be evaluated against the X-bar control chart's upper and lower control limits using statistical techniques.

If the R data for a subsequent flight does not fall into the established baseline control chart's upper and lower control limits, then the X-bar data shall not be used (there was some sort of computational variation of WOFV, WAPU, and WECS that invalidated some of the 5 consecutively computed CdALEAK results). Note that for a sample size of five readings for CdALEAK, the R-chart lower control limit (UCL) is zero ("0"), just by definition of the control charting technique.

Evaluation of the X-bar CdALEAK will primarily look for a trend of the CdALEAK in the increasing leakage direction—the fuselage leakage is increasing.

If the fuselage leakage is found to be trending toward and beyond the established upper control limit, the fuselage can be inspected to find and correct the offending leak.

For example, corrective action can include adjusting/repairing/replacing one or more valves at the ECS discharge and/or at the APU inlet. Adjusting/repairing/replacing may also include, for example, fuselage seals.

More specific details of the method 200, according to an exemplary embodiment, will now be described.

In a step 201, determine if the enclosure (e.g., an aircraft) is on a trip (e.g., in flight). If "no", then step 201 repeats. If "yes", then go to a step 202.

At step 202, determine if a ratio of environment (e.g., cabin) pressure to ambient pressure (i.e., outside of the enclosure) (Pc/Pa) is greater than a control limit (e.g., 1.87). If "no", then step 201 repeats. If "yes", then go to step 203.

At step 203, determine if the cabin altitude rate of change is "zero." If "no", then step 201 repeats. If "yes", then go to step 204.

In step 204, there is a triggering event to start data collection. For example, the event could be that the aircraft is at cruise altitude and the pressure ratio Pc/Pa exceeds a control limit. The method 200 may then proceed to a step 204a and/or a step 204b. If to both, step 204a and step 204b may occur at the same time or at different times.

In step 204a, read/collect data of Pa, Pc, Tc, and OFV "α", and compute WOFV multiple times (e.g., five times) in consecutive computational time frames (i.e., a first time period). The foregoing current data/values may be sent to one or more controllers (e.g., 102a,b,c), such as in the form of data signals.

In step 204b, read/collect WAPU, WECS multiple times (e.g., five times) in consecutive computational time frames (i.e., a second time period). The foregoing current data/values may be sent to one or more controllers (e.g., 102a, b,c), such as in the form of data signals. In embodiments, the number of times in step 204b may be the same or different from the number of times in step 204a. In embodiments, the second time period in step 204b may be the same or different (in point of time and/or duration) from the first time period in step 204a.

In a step 205, via a controller (e.g., 102a,b,c), compute WLEAK according to:

$$WLEAK=WECS-WOFV-WAPU$$

WLEAK may be computed multiple times (e.g., five times) in consecutive computational time frames (i.e., a third time period). The foregoing current data/values may be sent to/stored in one or more controllers (e.g., 102a,b,c), such as in the form of data signals. In embodiments, the number of times in step 205 may be the same or different from the number of times in steps 204a,b. In embodiments, the third time period in step 205 may be the same or different (in point of time and/or duration) from the first and second time periods in steps 204a,b.

In a step 206, via a controller (e.g., 102a,b,c), compute CdALEAK according to:

$$CdALEAK=f(Pc, Tc, Pa, WLEAK)$$

CdALEAK may be computed multiple times (e.g., five times) in consecutive computational time frames (i.e., a fourth time period). The foregoing current data/values may be sent to/stored in one or more controllers (e.g., 102a,b,c), such as in the form of data signals. In embodiments, the number of times in step 206 may be the same or different from the number of times in steps 204a,b and 205. In embodiments, the fourth time period in step 206 may be the same or different (in point of time and/or duration) from the first, second and third time periods in steps 204a,b and 205.

In a step 207, transmit the multiple calculations of CdALEAK (i.e., current CdALEAK values) to a controller, such as the maintenance system 102c or the server 102b. At the same time, a unique identifier of enclosure 100 (e.g., an aircraft tail number) may also be sent to the controller.

In a step 208, receive and store, in a controller such as the maintenance system 102c, the multiple calculations of CdALEAK (i.e., current CdALEAK values) for each trip/flight of enclosure 100. The unique identifier of enclosure 100 may be associated with the current CdALEAK values, especially if the controller is the server 102b located remote from enclosure 100.

In a step 209, send/transmit the multiple calculations of CdALEAK (i.e., current CdALEAK values) and unique identifier from the maintenance system 102c to a ground based Predictive Health Maintenance Computer, such as the server 102b.

In a step 210, for each trip/flight and unique identifier (e.g., aircraft tail number), receive and store in the Predictive Health Maintenance Computer, the current CdALEAK values (e.g., five calculations of CdALEAK) from step 209.

In a step 211, store the data from step 210 chronologically by each travel/flight and by each unique aircraft tail number identifier.

In a step 212, for each trip/flight by unique identifier, calculate an average (mean, "X-bar") of the multiple calculated CdALEAK (for example, five) (i.e., current CdALEAK values) from step 206 and calculate a range "R" of the multiple calculated CdALEAK (for example, five) (i.e., current CdALEAK values) from step 206. The calculations may be performed by the Predictive Health Maintenance Computer.

In a step 213, for each trip/flight by unique identifier, and based the averages and the ranges from step 210, create control charts (e.g., X-bar charts and R charts, respectively) from the past multiple calculated CdALEAK (i.e., historical CdALEAK values).

In a step 214, determine whether there is data from a minimum number of trips/flights (e.g., twenty) to establish statistical significance. If "yes", then go to step 215. If "no", then return to step 210.

In step 215, establish upper and lower CdALEAK (e.g., 102d) control limits from the control charts for the average (X-bar chart), and upper and lower CdALEAK control limit for the range (R chart).

In a step 216, determine whether the data from step 211 fall within the control limits. If "yes", then step 217. If "no", then step 218.

In step 218, the method 200 predicts a potential failure of the environmental pressure sensor 102d and/or advises a user that the environmental pressure sensor should be repaired or replaced.

In step 217, continue to plot into control charts of successive trip/flight data of average and range for calculated CdALEAK (i.e., historical CdALEAK values).

After step 217, in a step 219, while using the Predictive Health Maintenance Computer, receive and store multiple, calculated CdALEAK (e.g., five times) for each successive trip/flight (i.e., historical CdALEAK values).

In a step 220, the data from step 219 with the unique identifier is chronologically stored for continuing trips/flights.

In a step 221, an average (mean, "X-bar") of the multiple calculated CdALEAK (for example, five for each trip/flight) (i.e., historical CdALEAK values) from step 220 and a range ("R") of the multiple calculated CdALEAK (for example, five for each trip/flight) (i.e., historical CdALEAK values) can be calculated. The calculations may be performed by the Predictive Health Maintenance Computer.

In a step 222, data from step 221 is used to update the control charts.

In a step 223, determine if the multiple calculated CdALEAK of a given trip/flight fail statistical process control (SPC) tests. If "no", the return to step 219. If "yes", then go to step 222. The SPC tests detect behaviors that indicate fuselage leakage is not according to historical randomness (i.e., greater or less leakage). Useful SPC tests are described, for example, in DeVor, Chang, Sutherland, "Statistical Quality Design and Control Contemporary Concepts and Methods", Macmillan, 1992, Chapters 5 and 6 which is incorporated herein by reference.

In step 224, repair the aircraft 100 to improve/reduce the leakage or determine what is causing less leakage.

In step 225, the method 200 ends.

EXAMPLE

Twenty (20) flights of sample data were taken to demonstrate the collection of "current" CdALEAK. As described below, the current CdALEAK will become the "historical" CdALEAK for comparison against "continuing" CdALEAK.

X-bar and R charts were created to understand the normality using Statistical Process Control techniques. This plotted data included upper control limits (UCL) and lower control limits (LCL) to show graphically how the plus/minus 3-standard deviations of the normal data would remain, if unaffected.

The UCL and LCL only describe the actual data. They are not representative of the fuselage leakage (CdALEAK) performance requirements—and, in fact, are expected to be within the performance requirements (if the fuselage has not developed a progressively worse leak, and CdALEAK variation is just a function of the normal data collection and resulting computational variation).

Five (5) additional "continuing" flights are shown where a special cause effect to the fuselage leakage is simulated. This causes the data to "fail" the control chart expectation, possibly indicating that, soon, the fuselage leak will result in a worsening condition that might result in an excessive leak as this condition progresses.

Technique Description

FIG. 3 is a database (i.e., excel spreadsheet, only the average ("X-bar") and the range (R) of the 5-flights of CdALEAK are shown) of 20 flights of data. These first 20 flights represent current/historical CdALEAK, and are used to define "normal" operating performance in the baseline control charts.

Data Computed and Transmitted from the Cabin Pressure Controller

Data representing the five individual values of CdALEAK are obtained from the cabin pressure controller (CPC) in the cabin pressure control system (CPCS) on the airplane.

This data is transmitted from the CPC to another system on the airplane that collects maintenance information. That maintenance system then transmits this raw information off of the airplane to a ground based system that provides health monitoring and/or warning.

Alternatively, the CPC could have the ability to wirelessly transmit this data directly to a ground based system (without using an onboard maintenance computer).

When a ratio of Pc/Pa is equal to or greater than a given value (e.g., 1.87), WOFV is computed multiple times. WAPU and WECS is read multiple times. Based on the foregoing, WLEAK is computed multiple times and then CdALEAK is computed multiple times.

Ground-Based Predictive Health Maintenance System

For each flight, the respective multiple computations of current CdALEAK values can be stored by the Maintenance System. The total number of flights may be twenty (20), as shown in FIG. 3.

Control charts will utilize the multiple computations of current CdALEAK values, resulting in an average (X-bar) CdALEAK and range (R) of CdALEAK values for each flight, over the total of twenty flights as described in the next section.

Baseline Control Chart Computations

In FIG. 3, for each flight's data, for 20 flights, X-bar and R values, with control limits, can be computed. "X-DBL BAR" ($\bar{\bar{x}}$, "average of the averages") is computed from the X-bar (mean) data from each of the 20 flights. The same can be done for "R-DBL BAR" (average of the ranges, R).

The Lower Control Limit (LCL) represents the "minus three standard deviations" (−3sigma) line from the "mean of the mean" (X-DBL BAR) line. The Upper Control Limit (UCL) represents the "plus three standard deviations" (+3sigma) line from the "mean of the mean" (X-DBL BAR) line. The same can be done for R-DBL BAR.

Figure 4:
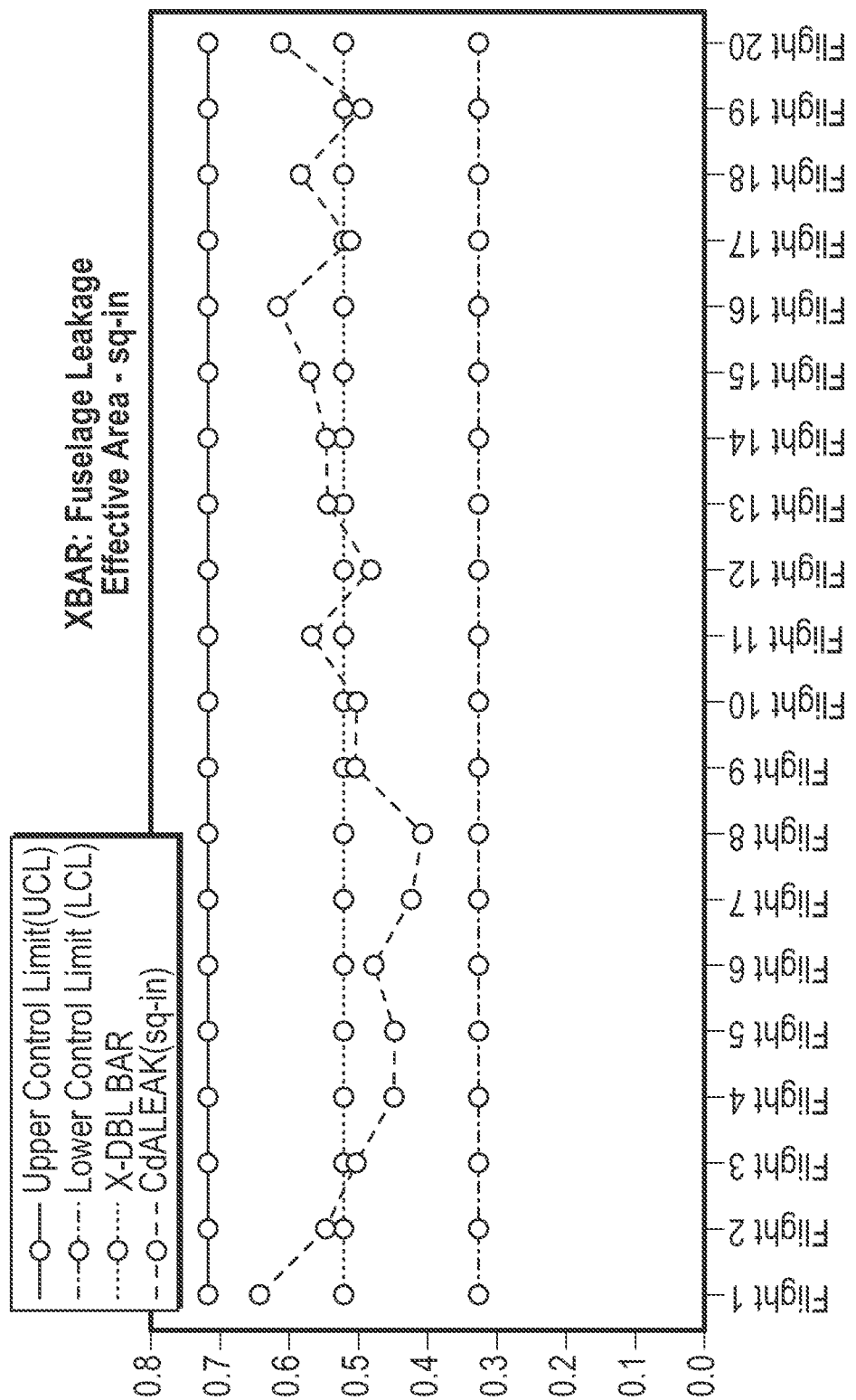
FIG. 4 is an X-bar chart of historical fuselage leakage effective area versus number of flights according to an embodiment of the present invention.

FIG. 4 is a plot of X bar fuselage leakage effective area versus twenty flights, with UCL, LCL and X-DBL BAR. The current/historical fuselage leakage effective area values fall within the UCL and LCL.

Figure 5:
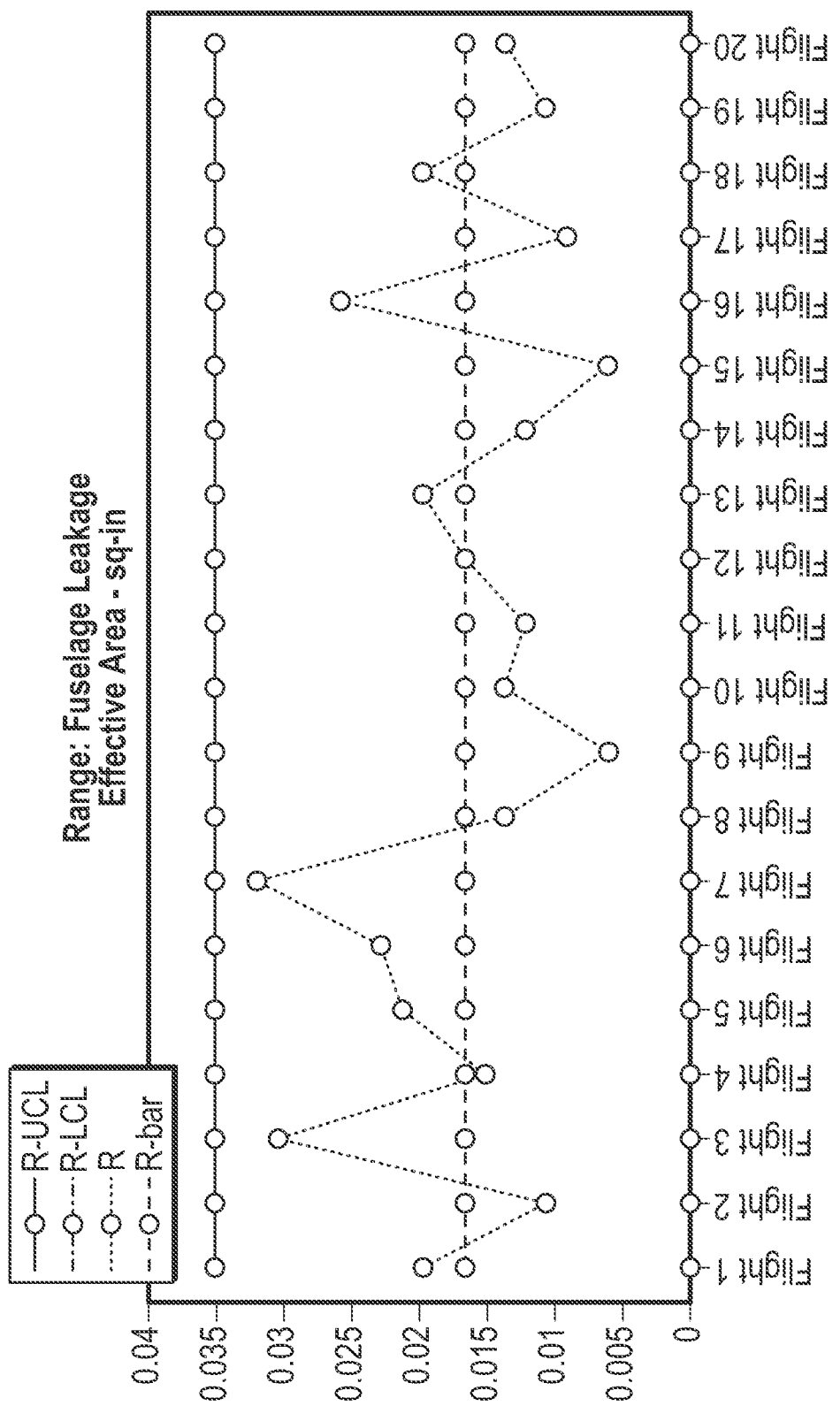
FIG. 5 is an R chart of historical fuselage leakage effective area versus number of flights according to an embodiment of the present invention.

FIG. 5 is a plot of R bar fuselage leakage effective area versus twenty flights, with UCL, LCL and R BAR. The current/historical fuselage leakage effective area values fall within the UCL and LCL. Note, for this example, LCL=0.

FIG. 6 is a database chart of the historical values from FIG. 3, in addition to five continuing/current flights. X-DBL BAR, R-DBL BAR, and the UCLs and LCLs are also included from the baseline original 20 flights.

Figure 7:
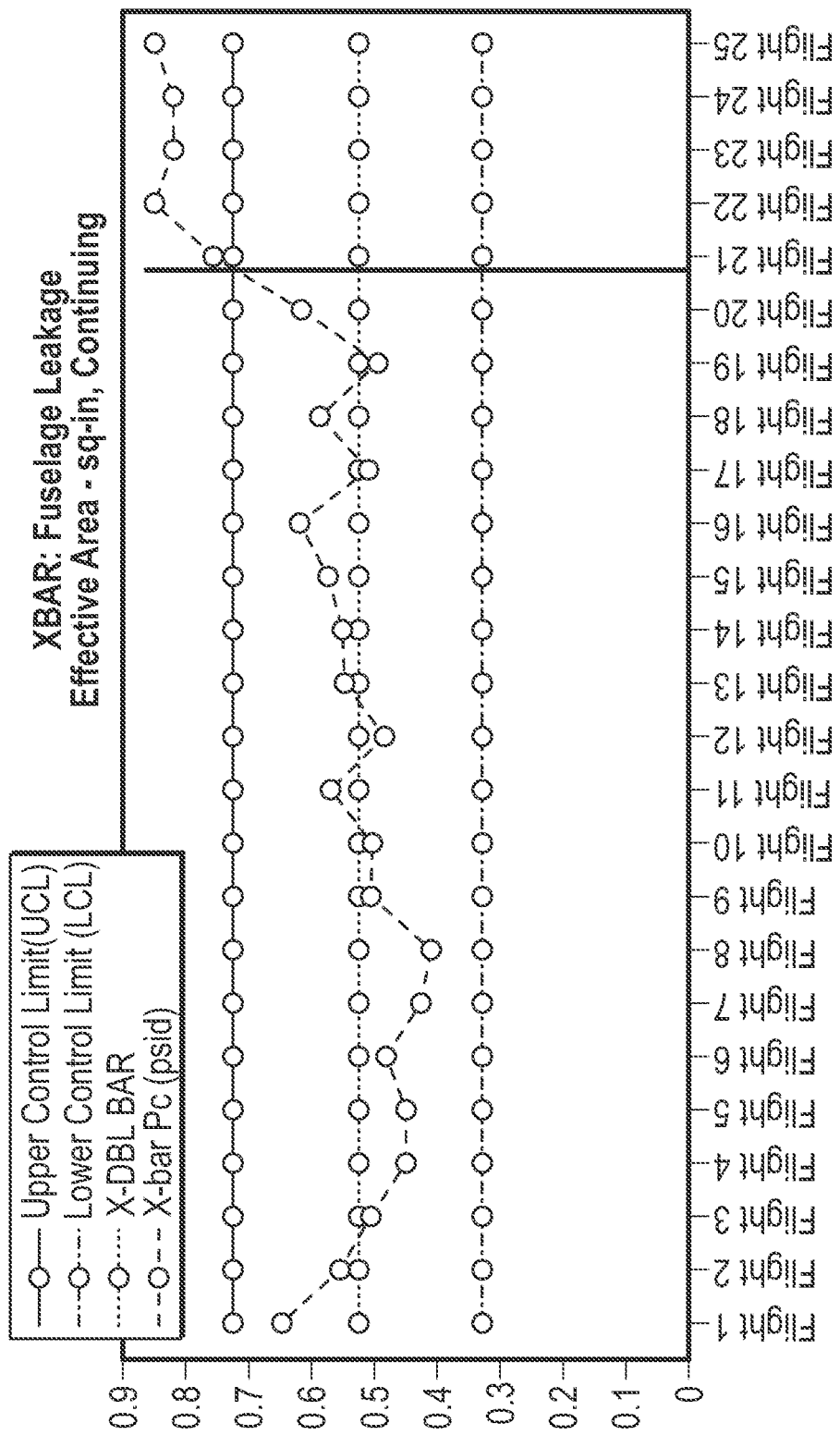
FIG. 7 is an X-bar chart of continuing fuselage leakage effective area versus number of flights according to an embodiment of the present invention.

FIG. 7 is a continuation of FIG. 4 with five additional flight data. In FIG. 7, flight 21 and thereafter have X-bar values that exceed the previously established UCL. Accordingly, corrective action may be warranted.

Figure 8:
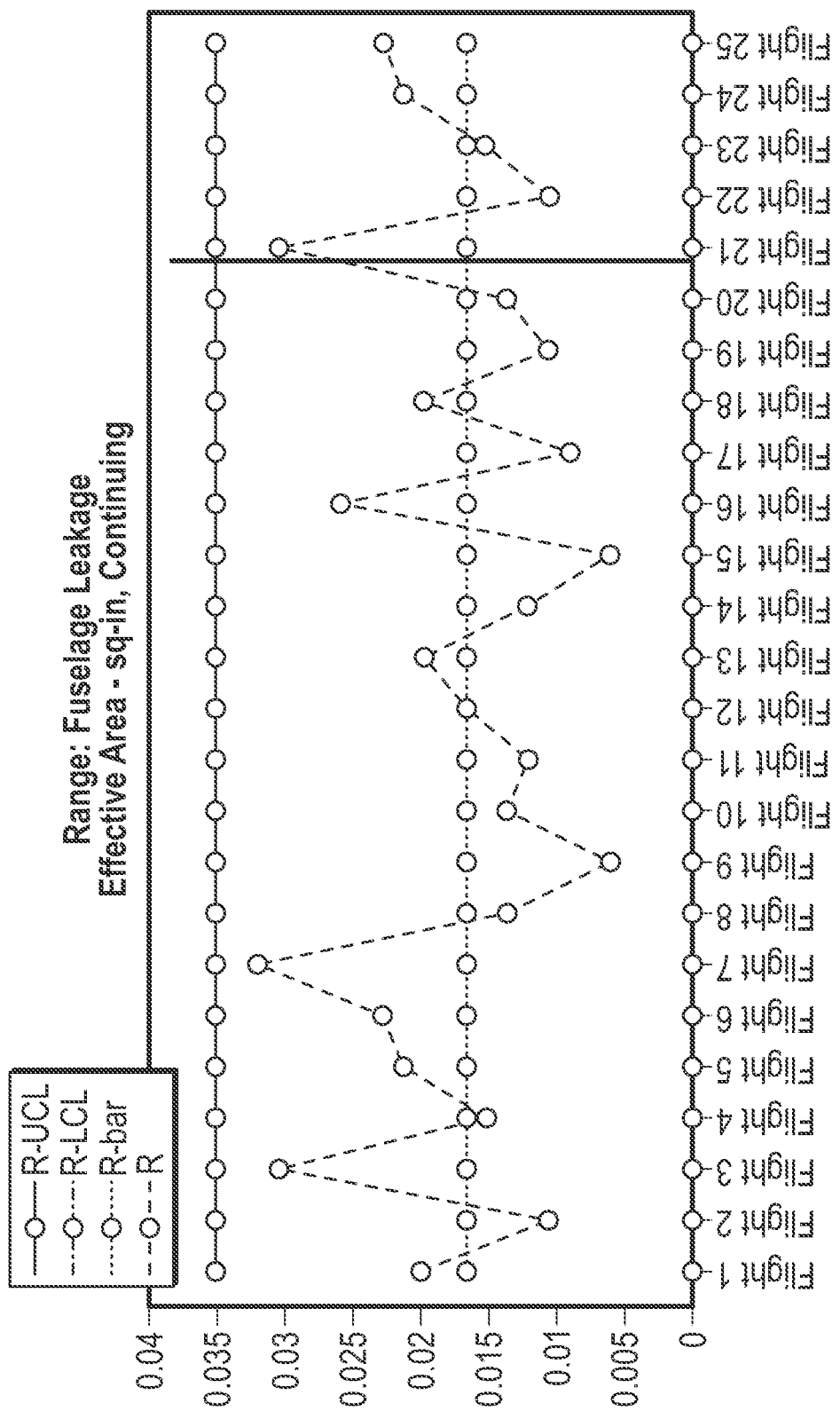
FIG. 8 is an R chart of continuing fuselage leakage effective area versus number of flights according to an embodiment of the present invention.

FIG. 8 is a continuation of FIG. 5 with five additional flight data. In FIG. 8, flight 21 and thereafter have R values within the previously established UCL and LCL limits, indicating that the corresponding X-bar values are statistically valid.

It should be understood, of course, that the foregoing relates to exemplary embodiments of the invention and that modifications may be made without departing from the spirit and scope of the invention as set forth in the following claims.

We claim:

1. A pressure control system for an environment to be pressurized, the pressure control system comprising:
a memory configured to store one or more control limits, wherein the one or more control limits are based at least on one or more historical leakage values; and
one or more processors in communication with the memory, the one or more processors configured to:
determine an effective area of a leakage based at least on a plurality of parameters, wherein the parameters include pressure of the environment, temperature of the environment, ambient pressure outside of the environment, and leakage flow rate,
wherein the leakage flow rate=WECS−WOFV−WAPU, wherein:
WECS=air pressure inflow into the environment,
WOFV=air pressure outflow to ambient that is outside of the environment, and
WAPU=f(Tin, Pin, APURPM, Flowfuel),
wherein:
Tin=inlet temperature to a power source,
Pin=inlet pressure to the power source,
APURPM=rotational speed of the power source, and
Flowfuel=power source fuel flow; and
compare the effective area with the one or more control limits to identify the presence of an adverse leakage condition that tends to affect a health of an enclosure of the environment; and
output, based at least on the comparison, an indication of the adverse leakage condition or, when the effective area satisfies the one or more control limits, one or more effective area values indicative of the effective area, the one or more effective area values used as operating parameters for subsequent health monitoring of the enclosure.

2. The system of claim 1, wherein the one or more processors are configured to determine the effective area when the ambient pressure is constant.

3. The system of claim 1, wherein the one or more processors are configured to:
determine the effective area when a ratio of the air pressure in the environment and the ambient pressure exceeds a given value.

4. The system of claim 1, wherein one or more of the parameters are determined a plurality of times in a first time period of consecutive computational time frames.

5. The system of claim 1, wherein WAPU and WECS are determined a plurality of times in a second time period.

6. The system of claim 1, wherein the effective area is determined a plurality of times in a third time period of consecutive computational time frames.

7. A pressure control system for an environment, within an enclosure, to be pressurized, the pressure control system comprising:
a controller in communication with an environment pressure sensor and an ambient pressure sensor, wherein the controller is configured to calculate an effective area of a leakage,
wherein the effective area represents pressurized air leakage from the enclosure when (1) an air pressure in the enclosure comprises a constant pressure, and (2) an ambient pressure outside of the enclosure comprises a constant pressure,
wherein the air pressure comprises pressurized air from a power source; and
a processor in communication with the controller and configured to:
compare the effective area with a control limit to identify the presence of an adverse leakage condition; and
output the adverse leakage condition or one or more effective area values indicative of the effective area, wherein the one or more effective area values comprise parameters for subsequent health monitoring of the enclosure.

8. The system of claim 7, wherein the controller is further configured to determine the effective area only when a ratio of the air pressure in the enclosure and the ambient pressure exceeds a given value.

9. The system of claim 7, wherein to compare the effective area with the control limit, the processor is configured to compare the effective area of the leakage to one or more historical leakage values.

10. The system of claim 7, wherein to compare the effective area with the control limit, the processor is configured to:
determine, based at least on one or more historical leakage values, an upper control limit and a lower control limit; and
compare the upper control limit or the lower control limit with the effective area to determine whether the effective area fails one or more control charts.

11. A non-transitory computer readable medium with computer executable instructions stored thereon, executed by a processor, to perform a method for controlling pressure in an environment within an enclosure, the method comprising:
determining an effective area of a leakage based at least on a plurality of parameters, the parameters including pressure of the environment, temperature of the environment, ambient pressure outside of the environment, and a WLEAK variable,
wherein WLEAK=WECS−WOFV−WAPU,
wherein:
WECS=air pressure inflow into the environment,
WOFV=air pressure outflow to ambient that is outside of the environment, and
WAPU=f(Tin, Pin, APURPM, Flowfuel),
wherein:
Tin=inlet temperature to a power source,
Pin=inlet pressure to the power source,
APURPM=rotational speed of the power source, and
Flowfuel=power source fuel flow; and
comparing the effective area of the leakage with the a control limit, wherein the control limit is based on a plurality of historical leakage values; and
identifying the presence of an adverse leakage condition that tends to affect a health of an enclosure.

12. The method of claim 11, wherein the processor is in communication with a database, the database comprising a plurality of historical leakage values.

13. The method of claim 12, wherein the database is used to determine upper control limits and lower control limits for comparison with the effective area.

14. The system of claim 1, wherein to output the one or more effective area values, the one or more processors are configured to:

output the one or more effective area values to a database, the database comprising the one or more historical leakage values, wherein the historical leakage values comprise historical effective area values determined over time.

15. The system of claim , wherein the effective area comprises the one or more effective area values, wherein the one or more effective area values are determined in the third time period.

16. The system of claim 7, wherein the controller is further configured to determine the effective area based at least on WLEAK.

17. The system of claim 7, wherein the effective area is represented in units of distance-squared, and wherein the effective area includes leakage from an aircraft, and wherein the effective area increases proportionally to changes in air flow of the power source.

18. The method of claim 11, wherein the adverse leakage condition comprises one or more of a fuselage leakage, a worsening leak, or an excessive leak.

19. The system of claim 1, wherein the adverse leakage condition comprises one or more of a fuselage leakage, a worsening leak, or an excessive leak.

20. The system of claim 7, wherein the adverse leakage condition comprises one or more of a fuselage leakage, a worsening leak, or an excessive leak.

* * * * *